(12) United States Patent
Leung et al.

(10) Patent No.: US 8,307,023 B1
(45) Date of Patent: Nov. 6, 2012

(54) DSP BLOCK FOR IMPLEMENTING LARGE MULTIPLIER ON A PROGRAMMABLE INTEGRATED CIRCUIT DEVICE

(75) Inventors: Wai-Bor Leung, Milpitas, CA (US); Henry Y. Lui, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1062 days.

(21) Appl. No.: 12/249,051

(22) Filed: Oct. 10, 2008

(51) Int. Cl.
*G06F 7/523* (2006.01)

(52) U.S. Cl. ....................................................... 708/625

(58) Field of Classification Search .................. None
See application file for complete search history.

(56) References Cited

U.S. PATENT DOCUMENTS

| | | |
|---|---|---|
| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |

(Continued)

FOREIGN PATENT DOCUMENTS

EP 0 158 430 10/1985

(Continued)

OTHER PUBLICATIONS

Altera Corporation, "FIR Compiler: MegaCore® Function User Guide," version 3.3.0, rev. 1, pp. 3 11 through 3 15 (Oct. 2005).

(Continued)

*Primary Examiner* — David H Malzahn
(74) *Attorney, Agent, or Firm* — Ropes & Gray LLP; Jeffrey H. Ingerman

(57) ABSTRACT

A programmable integrated circuit device includes a plurality of specialized processing blocks. Each specialized processing block may be small enough to occupy a single row of logic blocks. The specialized processing blocks may be located adjacent one another in different logic block rows, forming a column of adjacent specialized processing blocks. Each specialized processing block includes one or more multipliers based on carry-save adders whose outputs are combined using compressors. Chain-in and chain-out connections to the compressors allow adjacent specialized processing blocks to be cascaded to form arbitrarily large multipliers. Each specialized processing block also includes a carry-propagate adder, and the carry-propagate added in the final specialized processing block of the chain provides the final result. The size of the multiplication that may be performed is limited only by the number of specialized processing blocks in the programmable integrated circuit device.

29 Claims, 7 Drawing Sheets

U.S. PATENT DOCUMENTS

| | | | |
|---|---|---|---|
| 4,918,637 A | 4/1990 | Morton | |
| 4,967,160 A | 10/1990 | Quievy et al. | |
| 4,982,354 A | 1/1991 | Takeuchi et al. | |
| 4,991,010 A | 2/1991 | Hailey et al. | |
| 4,994,997 A | 2/1991 | Martin et al. | |
| 5,073,863 A | 12/1991 | Zhang | |
| 5,081,604 A | 1/1992 | Tanaka | |
| 5,122,685 A | 6/1992 | Chan et al. | |
| 5,128,559 A | 7/1992 | Steele | |
| 5,175,702 A | 12/1992 | Beraud et al. | |
| 5,208,491 A | 5/1993 | Ebeling et al. | |
| RE34,363 E | 8/1993 | Freeman | |
| 5,267,187 A | 11/1993 | Hsieh et al. | |
| 5,296,759 A | 3/1994 | Sutherland et al. | |
| 5,338,983 A | 8/1994 | Agarwala | |
| 5,339,263 A | 8/1994 | White | |
| 5,349,250 A | 9/1994 | New | |
| 5,357,152 A | 10/1994 | Jennings, III et al. | |
| 5,371,422 A | 12/1994 | Patel et al. | |
| 5,375,079 A | 12/1994 | Uramoto et al. | |
| 5,381,357 A | 1/1995 | Wedgwood et al. | |
| 5,404,324 A | 4/1995 | Colon-Bonet | |
| 5,424,589 A | 6/1995 | Dobbelaere et al. | |
| 5,446,651 A | 8/1995 | Moyse et al. | |
| 5,451,948 A | 9/1995 | Jekel | |
| 5,452,231 A | 9/1995 | Butts et al. | |
| 5,452,375 A | 9/1995 | Rousseau et al. | |
| 5,457,644 A | 10/1995 | McCollum | |
| 5,465,226 A | 11/1995 | Goto | |
| 5,465,375 A | 11/1995 | Thepaut et al. | |
| 5,483,178 A | 1/1996 | Costello et al. | |
| 5,497,498 A | 3/1996 | Taylor | |
| 5,500,812 A | 3/1996 | Saishi et al. | |
| 5,500,828 A | 3/1996 | Doddington et al. | |
| 5,523,963 A | 6/1996 | Hsieh et al. | |
| 5,528,550 A | 6/1996 | Pawate et al. | |
| 5,537,601 A | 7/1996 | Kimura et al. | |
| 5,541,864 A | 7/1996 | Van Bavel et al. | |
| 5,546,018 A | 8/1996 | New et al. | |
| 5,550,993 A | 8/1996 | Ehlig et al. | |
| 5,559,450 A | 9/1996 | Ngai et al. | |
| 5,563,526 A | 10/1996 | Hastings et al. | |
| 5,563,819 A | 10/1996 | Nelson | |
| 5,570,039 A | 10/1996 | Oswald et al. | |
| 5,570,040 A | 10/1996 | Lytle et al. | |
| 5,572,148 A | 11/1996 | Lytle et al. | |
| 5,581,501 A | 12/1996 | Sansbury et al. | |
| 5,590,350 A | 12/1996 | Guttag et al. | |
| 5,594,366 A | 1/1997 | Khong et al. | |
| 5,594,912 A | 1/1997 | Brueckmann et al. | |
| 5,596,763 A | 1/1997 | Guttag et al. | |
| 5,606,266 A | 2/1997 | Pedersen | |
| 5,617,058 A | 4/1997 | Adrian et al. | |
| 5,631,848 A | 5/1997 | Laczko et al. | |
| 5,633,601 A | 5/1997 | Nagaraj | |
| 5,636,150 A | 6/1997 | Okamoto | |
| 5,636,368 A | 6/1997 | Harrison et al. | |
| 5,640,578 A | 6/1997 | Balmer et al. | |
| 5,644,519 A | 7/1997 | Yatim | |
| 5,644,522 A | 7/1997 | Moyse et al. | |
| 5,646,545 A | 7/1997 | Trimberger et al. | |
| 5,646,875 A | 7/1997 | Taborn et al. | |
| 5,648,732 A | 7/1997 | Duncan | |
| 5,652,903 A | 7/1997 | Weng et al. | |
| 5,655,069 A | 8/1997 | Ogawara et al. | |
| 5,664,192 A | 9/1997 | Lloyd et al. | |
| 5,689,195 A | 11/1997 | Cliff et al. | |
| 5,696,708 A | 12/1997 | Leung | |
| 5,729,495 A | 3/1998 | Madurawe | |
| 5,740,404 A | 4/1998 | Baji | |
| 5,744,980 A | 4/1998 | McGowan et al. | |
| 5,744,991 A | 4/1998 | Jefferson et al. | |
| 5,754,459 A | 5/1998 | Telikepalli | |
| 5,761,483 A | 6/1998 | Trimberger | |
| 5,764,555 A | 6/1998 | McPherson et al. | |
| 5,768,613 A | 6/1998 | Asghar | |
| 5,771,186 A * | 6/1998 | Kodali et al. | 708/620 |
| 5,777,912 A | 7/1998 | Leung et al. | |
| 5,784,636 A | 7/1998 | Rupp | |
| 5,790,446 A | 8/1998 | Yu et al. | |
| 5,794,067 A | 8/1998 | Kadowaki | |
| 5,801,546 A | 9/1998 | Pierce et al. | |
| 5,805,477 A | 9/1998 | Perner | |
| 5,805,913 A | 9/1998 | Guttag et al. | |
| 5,808,926 A | 9/1998 | Gorshtein et al. | |
| 5,812,479 A | 9/1998 | Cliff et al. | |
| 5,812,562 A | 9/1998 | Baeg | |
| 5,815,422 A | 9/1998 | Dockser | |
| 5,821,776 A | 10/1998 | McGowan | |
| 5,825,202 A | 10/1998 | Tavana et al. | |
| 5,838,165 A | 11/1998 | Chatter | |
| 5,841,684 A | 11/1998 | Dockser | |
| 5,847,579 A | 12/1998 | Trimberger | |
| 5,847,978 A | 12/1998 | Ogura et al. | |
| 5,847,981 A | 12/1998 | Kelley et al. | |
| 5,859,878 A | 1/1999 | Phillips et al. | |
| 5,869,979 A | 2/1999 | Bocchino | |
| 5,872,380 A | 2/1999 | Rostoker et al. | |
| 5,874,834 A | 2/1999 | New | |
| 5,878,250 A | 3/1999 | LeBlanc | |
| 5,880,981 A | 3/1999 | Kojima et al. | |
| 5,892,962 A | 4/1999 | Cloutier | |
| 5,894,228 A | 4/1999 | Reddy et al. | |
| 5,898,602 A | 4/1999 | Rothman et al. | |
| 5,931,898 A | 8/1999 | Khoury | |
| 5,942,914 A | 8/1999 | Reddy et al. | |
| 5,944,774 A | 8/1999 | Dent | |
| 5,949,710 A | 9/1999 | Pass et al. | |
| 5,951,673 A | 9/1999 | Miyata | |
| 5,956,265 A | 9/1999 | Lewis | |
| 5,959,871 A | 9/1999 | Pierzchala et al. | |
| 5,960,193 A | 9/1999 | Guttag et al. | |
| 5,961,635 A | 10/1999 | Guttag et al. | |
| 5,963,048 A | 10/1999 | Harrison et al. | |
| 5,963,050 A | 10/1999 | Young et al. | |
| 5,968,196 A | 10/1999 | Ramamurthy et al. | |
| 5,970,254 A | 10/1999 | Cooke et al. | |
| 5,978,260 A | 11/1999 | Trimberger et al. | |
| 5,982,195 A | 11/1999 | Cliff et al. | |
| 5,986,465 A | 11/1999 | Mendel | |
| 5,991,788 A | 11/1999 | Mintzer | |
| 5,991,898 A | 11/1999 | Rajski et al. | |
| 5,995,748 A | 11/1999 | Guttag et al. | |
| 5,999,015 A | 12/1999 | Cliff et al. | |
| 5,999,990 A | 12/1999 | Sharrit et al. | |
| 6,005,806 A | 12/1999 | Madurawe et al. | |
| 6,006,321 A | 12/1999 | Abbott | |
| 6,009,451 A | 12/1999 | Burns | |
| 6,018,755 A | 1/2000 | Gonikberg et al. | |
| 6,020,759 A | 2/2000 | Heile | |
| 6,021,423 A | 2/2000 | Nag et al. | |
| 6,029,187 A | 2/2000 | Verbauwhede | |
| 6,031,763 A | 2/2000 | Sansbury | |
| 6,041,339 A | 3/2000 | Yu et al. | |
| 6,041,340 A | 3/2000 | Mintzer | |
| 6,052,327 A | 4/2000 | Reddy et al. | |
| 6,052,755 A | 4/2000 | Terrill et al. | |
| 6,055,555 A | 4/2000 | Boswell et al. | |
| 6,064,614 A | 5/2000 | Khoury | |
| 6,065,131 A | 5/2000 | Andrews et al. | |
| 6,066,960 A | 5/2000 | Pedersen | |
| 6,069,487 A | 5/2000 | Lane et al. | |
| 6,072,994 A | 6/2000 | Phillips et al. | |
| 6,073,154 A | 6/2000 | Dick | |
| 6,075,381 A | 6/2000 | LaBerge | |
| 6,084,429 A | 7/2000 | Trimberger | |
| 6,085,317 A | 7/2000 | Smith | |
| 6,091,261 A | 7/2000 | DeLange | |
| 6,091,765 A | 7/2000 | Pietzold, III et al. | |
| 6,094,726 A | 7/2000 | Gonion et al. | |
| 6,097,988 A | 8/2000 | Tobias | |
| 6,098,163 A | 8/2000 | Guttag et al. | |
| 6,107,820 A | 8/2000 | Jefferson et al. | |
| 6,107,821 A | 8/2000 | Kelem et al. | |
| 6,107,824 A | 8/2000 | Reddy et al. | |
| 6,130,554 A | 10/2000 | Kolze et al. | |
| 6,140,839 A | 10/2000 | Kaviani et al. | |

| | | | | | | |
|---|---|---|---|---|---|---|
| 6,144,980 | A | 11/2000 | Oberman | 6,978,287 | B1 | 12/2005 | Langhammer |
| 6,154,049 | A | 11/2000 | New | 6,983,300 | B2 | 1/2006 | Ferroussat |
| 6,157,210 | A | 12/2000 | Zaveri et al. | 7,020,673 | B2 | 3/2006 | Ozawa |
| 6,163,788 | A | 12/2000 | Chen et al. | 7,047,272 | B2 | 5/2006 | Giacalone et al. |
| 6,167,415 | A | 12/2000 | Fischer et al. | 7,062,526 | B1 | 6/2006 | Hoyle |
| 6,175,849 | B1 | 1/2001 | Smith | 7,093,204 | B2 | 8/2006 | Oktem et al. |
| 6,215,326 | B1 | 4/2001 | Jefferson et al. | 7,107,305 | B2 | 9/2006 | Deng et al. |
| 6,226,735 | B1 | 5/2001 | Mirsky | 7,113,969 | B1 | 9/2006 | Green et al. |
| 6,242,947 | B1 | 6/2001 | Trimberger | 7,181,484 | B2 | 2/2007 | Stribaek et al. |
| 6,243,729 | B1 | 6/2001 | Staszewski | 7,313,585 | B2 | 12/2007 | Winterrowd |
| 6,246,258 | B1 | 6/2001 | Lesea | 7,395,298 | B2 | 7/2008 | Debes et al. |
| 6,260,053 | B1 | 7/2001 | Maulik et al. | 7,401,109 | B2 | 7/2008 | Koc et al. |
| 6,279,021 | B1 | 8/2001 | Takano et al. | 7,409,417 | B2 | 8/2008 | Lou |
| 6,286,024 | B1 | 9/2001 | Yano et al. | 7,415,542 | B2 | 8/2008 | Hennedy et al. |
| 6,314,442 | B1 | 11/2001 | Suzuki | 7,421,465 | B1 | 9/2008 | Rarick et al. |
| 6,314,551 | B1 | 11/2001 | Borland | 7,428,565 | B2 | 9/2008 | Fujimori |
| 6,321,246 | B1 | 11/2001 | Page et al. | 7,428,566 | B2 | 9/2008 | Siu et al. |
| 6,323,680 | B1 | 11/2001 | Pedersen et al. | 7,430,578 | B2 | 9/2008 | Debes et al. |
| 6,327,605 | B2 | 12/2001 | Arakawa et al. | 7,430,656 | B2 | 9/2008 | Sperber et al. |
| 6,351,142 | B1 | 2/2002 | Abbott | 7,447,310 | B2 | 11/2008 | Koc et al. |
| 6,353,843 | B1 | 3/2002 | Chehrazi et al. | 7,472,155 | B2 | 12/2008 | Simkins et al. |
| 6,359,468 | B1 | 3/2002 | Park et al. | 7,508,936 | B2 | 3/2009 | Eberle et al. |
| 6,360,240 | B1 | 3/2002 | Takano et al. | 7,536,430 | B2 | 5/2009 | Guevokian et al. |
| 6,362,650 | B1 | 3/2002 | New et al. | 7,567,997 | B2 | 7/2009 | Simkins et al. |
| 6,366,944 | B1 | 4/2002 | Hossain et al. | 7,590,676 | B1 | 9/2009 | Langhammer |
| 6,367,003 | B1 | 4/2002 | Davis | 7,646,430 | B2 | 1/2010 | Brown Elliott et al. |
| 6,369,610 | B1 | 4/2002 | Cheung et al. | 7,668,896 | B2 | 2/2010 | Lutz et al. |
| 6,377,970 | B1 | 4/2002 | Abdallah et al. | 7,719,446 | B2 | 5/2010 | Rosenthal et al. |
| 6,407,576 | B1 | 6/2002 | Ngai et al. | 7,769,797 | B2 * | 8/2010 | Cho et al. ............... 708/625 |
| 6,407,694 | B1 | 6/2002 | Cox et al. | 7,930,335 | B2 | 4/2011 | Gura et al. |
| 6,427,157 | B1 | 7/2002 | Webb | 7,930,336 | B2 * | 4/2011 | Langhammer et al. ....... 708/620 |
| 6,434,587 | B1 | 8/2002 | Liao et al. | 2001/0023425 | A1 | 9/2001 | Oberman et al. |
| 6,438,569 | B1 | 8/2002 | Abbott | 2001/0029515 | A1 | 10/2001 | Mirsky |
| 6,438,570 | B1 | 8/2002 | Miller | 2001/0037352 | A1 * | 11/2001 | Hong ...................... 708/625 |
| 6,446,107 | B1 | 9/2002 | Knowles | 2002/0002573 | A1 | 1/2002 | Landers et al. |
| 6,453,382 | B1 | 9/2002 | Heile | 2002/0038324 | A1 | 3/2002 | Page et al. |
| 6,467,017 | B1 | 10/2002 | Ngai et al. | 2002/0049798 | A1 | 4/2002 | Wang et al. |
| 6,480,980 | B2 | 11/2002 | Koe | 2002/0078114 | A1 | 6/2002 | Wang et al. |
| 6,483,343 | B1 | 11/2002 | Faith et al. | 2002/0089348 | A1 | 7/2002 | Langhammer |
| 6,487,575 | B1 | 11/2002 | Oberman | 2002/0116434 | A1 | 8/2002 | Nancekievill |
| 6,523,055 | B1 | 2/2003 | Yu et al. | 2003/0088757 | A1 | 5/2003 | Lindner et al. |
| 6,523,057 | B1 | 2/2003 | Savo et al. | 2004/0064770 | A1 | 4/2004 | Xin |
| 6,531,888 | B2 | 3/2003 | Abbott | 2004/0083412 | A1 | 4/2004 | Corbin et al. |
| 6,538,470 | B1 | 3/2003 | Langhammer et al. | 2004/0103133 | A1 | 5/2004 | Gurney |
| 6,542,000 | B1 | 4/2003 | Black et al. | 2004/0122882 | A1 | 6/2004 | Zakharov et al. |
| 6,556,044 | B2 | 4/2003 | Langhammer et al. | 2004/0148321 | A1 | 7/2004 | Guevorkian et al. |
| 6,557,092 | B1 | 4/2003 | Callen | 2004/0172439 | A1 | 9/2004 | Lin |
| 6,571,268 | B1 | 5/2003 | Giacalone et al. | 2004/0178818 | A1 | 9/2004 | Crotty et al. |
| 6,573,749 | B2 | 6/2003 | New et al. | 2004/0193981 | A1 | 9/2004 | Clark et al. |
| 6,574,762 | B1 | 6/2003 | Karimi et al. | 2004/0267857 | A1 | 12/2004 | Abel et al. |
| 6,591,283 | B1 | 7/2003 | Conway et al. | 2004/0267863 | A1 | 12/2004 | Bhushan et al. |
| 6,591,357 | B2 | 7/2003 | Mirsky | 2005/0038842 | A1 | 2/2005 | Stoye |
| 6,600,495 | B1 | 7/2003 | Boland et al. | 2005/0144212 | A1 | 6/2005 | Simkins et al. |
| 6,600,788 | B1 | 7/2003 | Dick et al. | 2005/0144215 | A1 | 6/2005 | Simkins et al. |
| 6,628,140 | B2 | 9/2003 | Langhammer et al. | 2005/0144216 | A1 | 6/2005 | Simkins et al. |
| 6,687,722 | B1 | 2/2004 | Larsson et al. | 2005/0166038 | A1 | 7/2005 | Wang et al. |
| 6,692,534 | B1 | 2/2004 | Wang et al. | 2005/0187997 | A1 | 8/2005 | Zheng et al. |
| 6,700,581 | B2 | 3/2004 | Baldwin et al. | 2005/0187999 | A1 | 8/2005 | Zheng et al. |
| 6,725,441 | B1 | 4/2004 | Keller et al. | 2005/0262175 | A1 | 11/2005 | Iino et al. |
| 6,728,901 | B1 | 4/2004 | Rajski et al. | 2006/0020655 | A1 | 1/2006 | Lin |
| 6,731,133 | B1 | 5/2004 | Feng et al. | 2007/0083585 | A1 | 4/2007 | St. Denis et al. |
| 6,732,134 | B1 | 5/2004 | Rosenberg et al. | 2007/0185951 | A1 | 8/2007 | Lee et al. |
| 6,744,278 | B1 | 6/2004 | Liu et al. | 2007/0185952 | A1 | 8/2007 | Langhammer et al. |
| 6,745,254 | B2 | 6/2004 | Boggs et al. | 2007/0241773 | A1 | 10/2007 | Hutchings et al. |
| 6,763,367 | B2 | 7/2004 | Kwon et al. | 2008/0133627 | A1 | 6/2008 | Langhammer et al. |
| 6,771,094 | B1 | 8/2004 | Langhammer et al. | 2008/0183783 | A1 | 7/2008 | Tubbs |
| 6,774,669 | B1 | 8/2004 | Liu et al. | 2009/0172052 | A1 | 7/2009 | DeLaquil et al. |
| 6,781,408 | B1 | 8/2004 | Langhammer | 2009/0187615 | A1 | 7/2009 | Abe et al. |
| 6,781,410 | B2 | 8/2004 | Pani et al. | 2009/0300088 | A1 | 12/2009 | Michaels et al. |
| 6,788,104 | B2 | 9/2004 | Singh et al. | 2010/0098189 | A1 | 4/2010 | Oketani |
| 6,801,924 | B1 | 10/2004 | Green et al. | | | | |
| 6,801,925 | B1 | 10/2004 | Pether et al. | | | | |
| 6,836,839 | B2 | 12/2004 | Master et al. | | | | |
| 6,874,079 | B2 | 3/2005 | Hogenauer | | | | |
| 6,889,238 | B2 | 5/2005 | Johnson | | | | |
| 6,904,471 | B2 | 6/2005 | Boggs et al. | | | | |
| 6,924,663 | B2 | 8/2005 | Masui et al. | | | | |
| 6,963,890 | B2 | 11/2005 | Dutta et al. | | | | |
| 6,971,083 | B1 | 11/2005 | Farrugia et al. | | | | |

FOREIGN PATENT DOCUMENTS

| | | |
|---|---|---|
| EP | 0 380 456 | 8/1990 |
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |

| | | |
|---|---|---|
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO2005/101190 | 10/2005 |

OTHER PUBLICATIONS

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.
Govindu, G. et al., "Analysis of High-performance Floating-point Arithmetic on FPGAs," *Proceedings of the 18th International Parallel and Distributed Processing Symposium (PDPS'04)* pp. 149-156, Apr. 2004.
Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.
Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.
Vladimirova, T. et al., "Floating-Point Mathematical Co-Processor for a Single-Chip On-Board Computer," *MAPLD'03 Conference, D5*, Sep. 2003.
Altera Corporation, "DSP Blocks in Stratix II and Stratix II GX Devices," *Stratix II Device Handbook*, vol. 2, Chapter 6, v4.0 (Oct. 2005).
Underwood, K. "FPGAs vs. CPUs: Trends in Peak Floating-Point Performance," *Proceedings of the 2004 ACM/SIGDA 12th International Symposium on Field Programmable Gate Arrays*, pp. 171-180, Feb. 22-24, 2004.
Xilinx Inc., "XtremeDSP Design Considerations User Guide," v 1.2, Feb. 4, 2005.
Amos, D., "PLD architectures match DSP algorithms," *Electronic Product Design*, vol. 17, No. 7, Jul. 1996, pp. 30, 32.
Analog Devices, Inc., The Applications Engineering Staff of Analog Devices, DSP Division, *Digital Signal Processing Applications Using the ADSP-2100 Family* (edited by Amy Mar), 1990, pp. 141-192).
Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.
Aoki, T., "Signed-weight arithmetic and its application to a field-programmable digital filter architecture," *IEICE Transactions on Electronics*, 1999, vol. E82C, No. 9, Sep. 1999, pp. 1687-1698.
Ashour, M.A., et al., "An FPGA implementation guide for some different types of serial-parallel multiplier-structures," *Microelectronics Journal*, vol. 31, No. 3, 2000, pp. 161-168.
Berg. B.L., et al."Designing Power and Area Efficient Multistage FIR Decimators with Economical Low Order Filters," *ChipCenter Technical Note*, Dec. 2001.
Bursky, D., "Programmable Logic Challenges Traditional ASIC SoC Designs", *Electronic Design*, Apr. 15, 2002.
Chhabra, A. et al., Texas Instruments Inc., "A Block Floating Point Implementation on the TMS320C54x DSP", Application Report SPRA610, Dec. 1999, pp. 1-10.
Colet, P., "When DSPs and FPGAs meet: Optimizing image processing architectures," *Advanced Imaging*, vol. 12, No. 9, Sep. 1997, pp. 14, 16, 18.
Crookes, D., et al., "Design and implementation of a high level programming environment for FPGA-based image processing," *IEE Proceedings-Vision, Image and Signal Processing*, vol. 147, No. 4, Aug. 2000, pp. 377-384.
Debowski, L., et al., "A new flexible architecture of digital control systems based on DSP and complex CPLD technology for power conversion applications," *PICM 2000: Europe Official Proceedings of the Thirty-Seventh International Intelligent Motion Conference*, Jun. 6-8, 2000, pp. 281-286.
Dick, C., et al., "Configurable logic for digital communications: some signal processing perspectives," *IEEE Communications Magazine*, vol. 37, No. 8, Aug. 1999, pp. 107-111.
Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.
Gaffer, A.A., et al., "Floating-Point Bitwidth Analysis via Automatic Differentiation," *IEEE Conference on Field Programmable Technology*, Hong Kong, Dec. 2002.
Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Device*, Jun. 1998, http://www.ee.washington.edu/people/faculty/hauck/publications/ReconfigFuture.PDF.
Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
Lattice Semiconductor Corp, *ORCA® FPGA Express™ Interface Manual: ispLEVER® Version 3.0*, 2002.
Lucent Technologies, Microelectronics Group,"Implementing and Optimizing Multipliers in ORCA™ FPGAs,", Application Note. AP97-008FGPA, Feb. 1997.
"Implementing Multipliers in FLEX 10K EABs", *Altera*, Mar. 1996.
"Implementing Logic with the Embedded Array in FLEX 10K Devices", *Altera*, May 2001, ver. 2.1.
Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.
Jones, G., "Field-programmable digital signal conditioning," *Electronic Product Design*, vol. 21, No. 6, Jun. 2000, pp. C36-C38.
Kiefer, R., et al., "Performance comparison of software/FPGA hardware partitions for a DSP application," *14th Australian Microelectronics Conference Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics* (Cat. No. 99TH8465), vol. 3 , Jul. 12-16, 1999, pp. 1522-1525.

Langhammer, M., "How to implement DSP in programmable logic " *Elettronica Oggi*, No. 266, Dec. 1998, pp. 113-115.

Langhammer, M., "Implementing a DSP in Programmable Logic," *Online EE Times*, May 1998, http://www.eetimes.com/editorial/1998/coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2/1-2/4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9) vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28,1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL '99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http://mathworld.wolfram.com/KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http://www.iro.umontreal.ca/~aboulham/F6221/Xilinx%20A%201D%20systolic%20FIR.htm.

Xilinx, Inc., "The Future of FPGA's," White Paper, available Nov. 14, 2005 for download from http://www.xilinx.com/prs_rls,5yrwhite.htm.

Altera Corporation, "Digital Signal Processing (DSP)," *Stratix Device Handbook*, vol. 2, Chapter 6 and Chapter 7, v1.1 (Sep. 2004).

Altera Corporation, "Stratix II Device Handbook, Chapter 6—DSP Blocks in Stratix II Devices," v1.1, Jul. 2004.

Xilinx Inc., "Complex Multiplier v2.0", DS291 Product Specification/Datasheet, Nov. 2004.

Haynes, S.D., et al., "Configurable multiplier blocks for embedding in FPGAs," *Electronics Letters*, vol. 34, No. 7, pp. 638-639 (Apr. 2, 1998).

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., 2009.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

* cited by examiner

DSP BLOCK FOR IMPLEMENTING LARGE MULTIPLIER ON A PROGRAMMABLE INTEGRATED CIRCUIT DEVICE

BACKGROUND OF THE INVENTION

This invention relates to programmable integrated circuit devices—e.g., programmable logic devices (PLDs), and, more particularly, to the use of specialized processing blocks which may be included in such devices to perform large multiplications.

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, the STRATIX® III PLD sold by Altera Corporation, of San Jose, Calif., includes DSP blocks, each of which includes the equivalent of four 18-bit-by-18-bit multipliers. Each of those DSP blocks also includes adders and registers, as well as programmable connectors (e.g., multiplexers) that allow the various components to be configured in different ways. In each such block, the multipliers can be configured as two operations each involving two 18-bit-by-18-bit multipliers, or as one larger (36-bit-by 36-bit) multiplier. In addition, one 18-bit-by-18-bit complex multiplication (which decomposes into two 18-bit-by-18-bit multiplication operations for each of the real and imaginary parts) can be performed. Also, up to two individual 18-bit-by-18-bit multiplications can be performed. Moreover, the two members of any pair of multipliers can be configured for multiplications smaller than 18-bit-by-18-bit.

Although such a DSP block may be configured as a multiplier as large as 36-bit-by-36-bit, a user may want to create a larger multiplier. For example, while a 36-bit-by-36-bit multiplier will support 25-bit-by-25-bit single-precision multiplication under the IEEE 754-1985 standard, it is too small for double-precision multiplication, or for 36-bit-by-36-bit complex multiplication. While the multipliers from several DSP blocks can be used together to implement double-precision multiplication, or larger complex multiplication, the logic needed to interconnect the multipliers has heretofore been programmed by the user in the general-purpose programmable logic outside the DSP block, making it slow and less efficient, and consuming general-purpose resources that might be put to other uses. Moreover, such architectures have relied on two or more carry-propagate operations to arrive at the final product, and a carry-propagate adder is a relatively slow adder configuration.

SUMMARY OF THE INVENTION

The present invention relates to specialized processing blocks for programmable integrated circuit devices such as PLDs, which are provided with links to adjacent blocks, allowing multiple blocks to be combined for larger operations than can be performed within any single specialized processing block, reducing or eliminating reliance on general-purpose programmable resources of the device.

In accordance with this invention, large multipliers may be implemented by connecting or chaining multiple fine-grained DSP blocks—i.e., DSP blocks that individually perform relatively small multiplications, but not smaller than might be useful by itself. Preferably, the DSP blocks to be connected are physically adjacent to one another to minimize propagation delay. Within the DSP blocks, most multiplication and addition operations are performed with carry-save adders. The connections between adjacent DSP blocks preferably also make use of the carry-save adder signal bus. A carry-propagate adder, which is slower, may be used for generating the final output of the chain of DSP blocks.

Thus, in accordance with the present invention, there is provided a specialized processing block for a programmable integrated circuit device having a plurality of specialized processing blocks. The specialized processing block includes multiplier circuitry that performs at least one multiplication and provides partial sum/carry signals for each of the at least one multiplication, a chain output for propagating partial sum/carry signals to another specialized processing block, a chain input for receiving partial sum/carry signals propagated from another specialized processing block, and combining circuitry that combines the partial sum/carry signals for each multiplication and any partial sum/carry signals propagated from another specialized processing block, for propagation to the output.

A programmable logic device incorporating such specialized processing blocks also is provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION OF THE INVENTION

Figure 1:
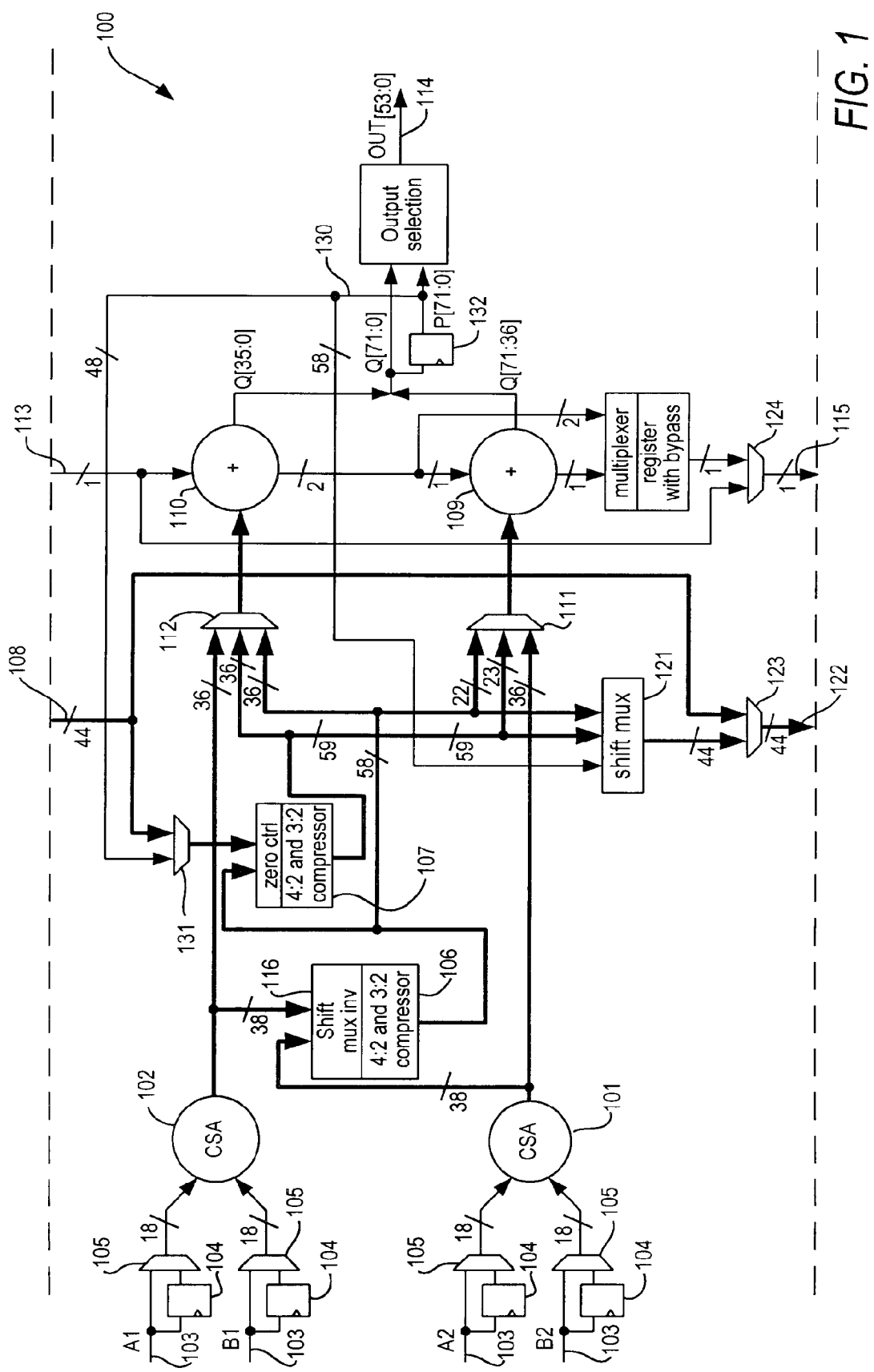
FIG. 1 is schematic representation of a DSP block according to a preferred embodiment of the present invention.

A DSP block in accordance with the present invention may include one or more N-bit-by-N-bit multipliers. Such a DSP block may include the following functional blocks:

1. Partial product generation, preferably based on Booth recoding;
2. A respective carry-save adder for partial products from each multiplier;
3. A further carry-save adder for partial sum/carry from all multipliers within the DSP block, as well as the chained-in partial sum/carry from any adjacent DSP block; and
4. A carry-propagate adder for the final output.

Such a DSP architecture provides the logic to generate partial sum/carry from multipliers of the aforementioned relatively small operand sizes, and to add the partial sum/carry from the current DSP block and an adjacent DSP block. Because the chain-in from any adjacent DSP block is based on partial sum/carry signals from a carry-save adder, the propagation delay to add the chain-in results is that contributed by one 4-to-2 compressor (or about 1.5 times of the delay of a full adder). In contrast, previous blocks relied on output signals from a carry-propagate adder, or possibly a carry-lookahead adder, for the chain-in results. In the case of a carry-propagate adder, the delay includes the combined delay of a full adder in every block in the chain, and while the delay for a carry-lookahead adder is smaller, it is still much larger than the delay of a full adder.

The trade-off for the reduction in delay using a carry-save adder is that the overall area of a DSP block based on carry-save adders for chaining is about slightly larger than previous DSP blocks relying on carry-propagate adders for chaining. For example, in the case of the STRATIX® family of programmable logic devices available from Altera Corporation, of San Jose, Calif., the increase in area is about 1.5%.

The fast interconnection based on the partial sum/carry signals allows the creation of very large multipliers with high performance from multiple DSP blocks. In accordance with the invention, a 54-bit-by-54-bit multiplier implemented using 18-bit-by-18-bit multiplier modules may be significantly faster than a comparable multiplier created from DSP blocks based on carry-propagate adders. Moreover, compared with other previously-known architectures in which the final adder is implemented in programmable logic of the PLD core, the present invention may provide a substantial $f_{max}$ improvement, in addition to saving substantial programmable logic resources and interconnection resources in the PLD core.

Performing multiplication operations without utilizing the PLD core fabric can save a significant amount of power. In one example of a 54-bit-by-54-bit multiplier, assuming that power consumption is proportional to block area for the same power density, and even assuming the power density of a DSP block is four times that of programmable logic in the PLD core, and that the DSP block area according to the present invention increases by about 10% over the area of the previously-known DSP blocks (including the area added by the carry-save adders as well as additional area added by other circuitry such as shifters and multiplexers), then the power consumption of a 54-bit-by-54-bit multiplier configured according to the present invention may nevertheless be reduced by about 50% by the elimination of the use of programmable logic.

In a fine-grained DSP architecture according to the invention, each DSP block may be small enough to fit into a single row of logic blocks in the PLD floorplan. That enables row-redundancy support of more of the DSP blocks than in devices with multi-row DSP blocks, enabling an improvement in yield. In addition, bypass multiplexers used to turn off row redundancy for rows where there are multi-row DSP blocks can be eliminated, reducing delay in a critical path of DSP system. This can enhance $f_{max}$ of the DSP system.

A fine-grained DSP architecture better reflects that not all PLD users require large multiplying operations. According to some estimates, 90% of existing DSP designs utilize operands of 18-bit-by-18-bit or smaller, while 27% utilize operands of 9-bit-by-9-bit or smaller. That means that in a large DSP module with a 36-bit-by-36-bit multiplier, the DSP utilization rate is only about 29%. According to the present invention, assuming a fine-grained multiplier size of 18-bit-by 18, the DSP utilization rate can be close to 80% while still supporting 36-bit-by-36-bit and even larger multiplications. In terms of die area, implementing 18-bit-by-18-bit multipliers in a coarse-grained 36-bit-by-36-bit architecture may consume about four times as much area as implementing the same multipliers in a fine-grained 18-bit-by-18-bit architecture.

A fine-grained architecture also allows an increase in the DSP density by eliminating odd remaining rows that cannot fit a large DSP block. For example, in some large PLD devices, using single-row DSP blocks can improve the DSP block count by up to 9% (depending on the total number of rows) as compared to using DSP blocks that span four rows.

Because no core logic circuits or interconnection routings are needed in the construction of large multipliers using the present invention, more PLD fabric resources are available for other uses, and congestion may be reduced leading to better fitting of user logic designs. The architecture according to the invention is fully scalable and therefore applicable to PLDs regardless of density. In fact, higher-density devices would have more adjacent DSP modules, and therefore would support even larger multipliers.

There is no theoretical limit on chaining, and therefore the only physical limit is the number of adjacent DSP blocks in one column. For example, in the largest model of the PLD product sold by Altera Corporation, of San Jose, Calif., under the name STRATIX® IV, which has 138 rows of logic blocks, there are 138 adjacent DSP blocks in a column. In accordance with the present invention, such a device, which has 276 adjacent 18-bit-by-18-bit multipliers per DSP block column, could support a multiplier as large as 272×18×18, broken down to (17×18)-by-(16×18) or 306-bits-by-288-bits.

A DSP block according to the present invention includes at least one N-bit-by-N-bit multiplier. A preferred embodiment of a DSP block 100, shown in FIG. 1, includes two N-bit-by-N-bit multipliers, each implemented using a respective carry-save adder 101, 102. The choice of N should be large enough to be useful but small enough to allow DSP block 100 to fit into one row of PLD logic blocks. If, as estimated above, about 90% of DSP designs use multiplications of size 18-bit-by-18-bit or smaller, and about 27% are 9-bit-by-9-bit or smaller, then 18-bit-by-18-bit multipliers, which can be configured as smaller multipliers as well (in addition to being combined for larger multiplications) are a reasonable selection, and therefore in this example N=18.

The operands 103 can be entered asynchronously, or can be registered in registers 104, under control of multiplexers 105. If each multiplier is to be used independently, the respective output of respective CSA 101, 102 can be selected by a respective one of multiplexers 111, 112. Compressor 106 is provided to allow the two multiplications to be combined. Compressor 106 may include shifting, multiplexing and inverting inputs 116, as shown. If compressor 106 is used, it may be selected by multiplexers 111, 112. An additional compressor 107 is provided in accordance with the invention to allow chain-in input 108 from an adjacent one of DSP blocks 100 to be combined with the output of the current operations as processed through compressor 106. Again, if compressor 107 is used, it may be selected by multiplexers 111, 112. The outputs of compressors 106, 107 also may be selected by multiplexer 121 as chain-out output 122.

Carry-propagate adders 109, 110 are provided to combine the current carry-save output with carry-in input 113 from a previous one (if any) of DSP blocks 100, to provide partial final output 114, and, unless this is the final DSP block 100 in the chain, a carry-out output 115 which will serve as a carry-in input 113 to a subsequent one of DSP blocks 100. This allows the carry-propagate adders from the various DSP blocks 100 in the chain to be used as a single larger carry-propagate adder while propagating only carry-out 115, rather than both carry-out 15 and sum 114, to subsequent DSP blocks 100.

Both chain-in input 108 and carry-in input 113 may bypass DSP block 100 completely, and be output directly to chain-out output 122 and carry-out output 115, respectively, under control of respective multiplexers 123, 124. This allows for redundancy in the event that DSP block 100 is defective and must be completely bypassed, allowing the chain and carry signals to propagate to the next one of DSP blocks 100.

Registered output 130 may routed back to compressor 107, where it may be selected by multiplexer 131 to enable an accumulator function. Signal 130 also may be routed to multiplexer 121 to enable pipeline operation in large multipliers. This allows the output register 132 to serve as a pipeline register when pipelining is used, rather than adding an additional register for that purpose downstream of multiplexer 121 (whether inside or outside of DSP block 100).

In this configuration, the two N-bit-by-N-bit multipliers may be implemented in one DSP block, and they can be programmed as two independent multipliers. They also can work together to maximize the performance of two-multiplier operations, and provide a high degree of flexibility in building larger multipliers. The partial sum and partial carry vectors from the compressor blocks may be chosen for the chain-out signals to minimize the use of the carry-propagate adders and the associated impacts on delay and power. Output registers may be provided after the compressors to improve performance for large multipliers, and to assist in the construction of filters, such as a finite impulse response (FIR) filter. The user can trade output latency with higher clock frequency by using the registers to create pipeline stages.

For a multiplication operation, SxT, where one or both of the operands (S and/or T) are wider than N bits, the operands can be extended at the most significant bit position to a multiple of N, and divided in segments of N bits each. The product can be written as the sum of outputs of a plurality of N-bit-by-N-bit multipliers. For example, where S and T are both 54 bits wide (as in the case of double-precision floating point operations), each of S and T can be broken into three respective 18-bit segments A3|A2|A1 and B3|B2|B1.

Figure 2:
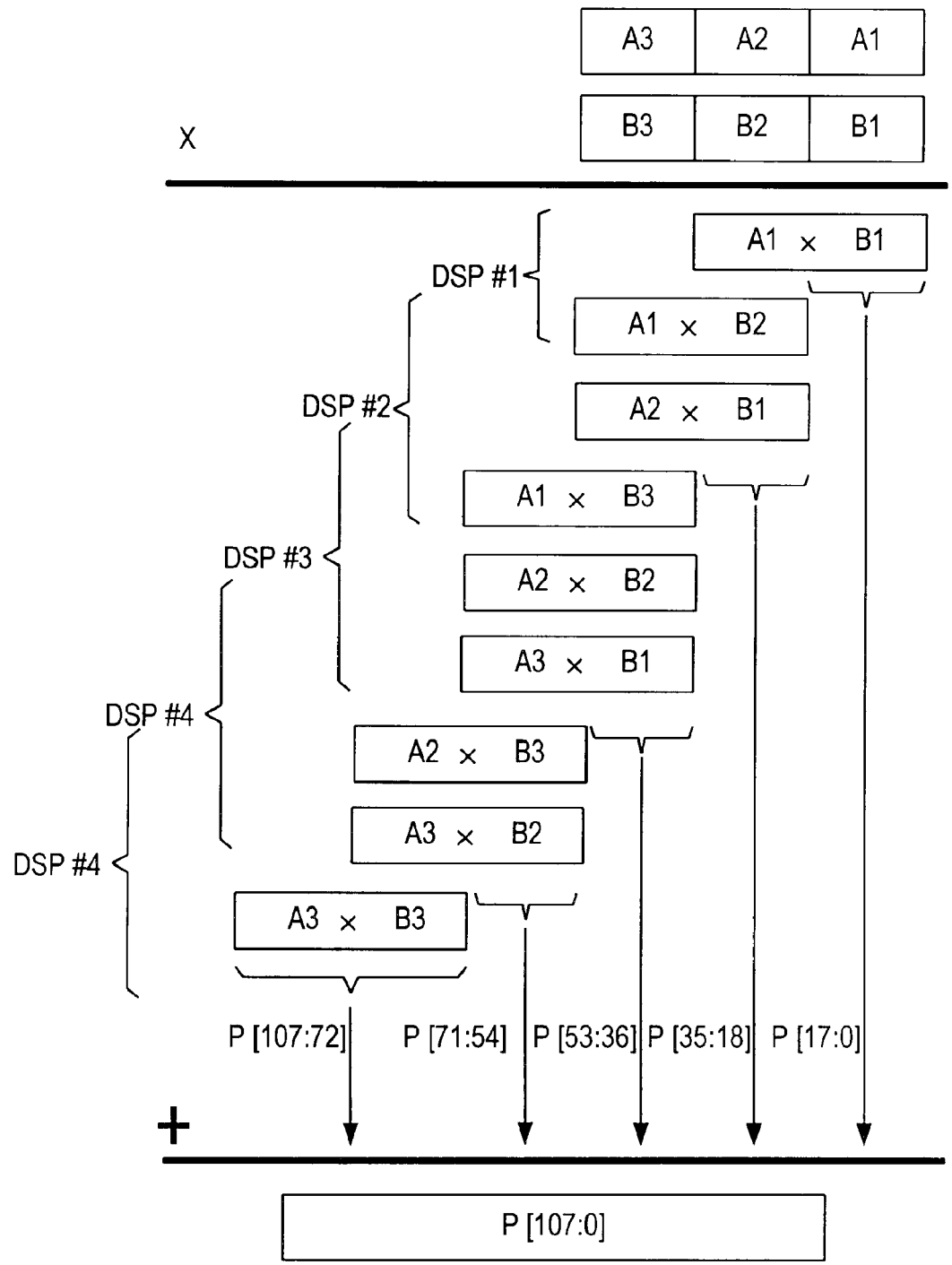
FIG. 2 is a representation of the decomposition of a 54-bit-by-54-bit multiplication into 18-bit-by-18-bit multiplications.

The multiplication operation can be decomposed as shown in FIG. 2 into nine partial products A1×B1, A2×B1, etc., which can be performed by nine 18-bit-by-18-bit multipliers and combined, after appropriate left-shifting by appropriate multiples of 18 bits (representing corresponding powers of $2^{18}$), to form 108-bit product 200. The operation can be written as:

$$P[107:0] = \{A3 \mid A2 \mid A1\} \times \{B3 \mid B2 \mid B1\}$$

$$= A3 \times B3 \times 2^{72} + (A3 \times B2 + A2 \times B3) \times 2^{54} + (A3 \times B1 + A2 \times B2 + A1 \times B3) \times 2^{36} + (A2 \times B1 + A1 \times B2) \times 2^{18} + A1 \times B1$$

Figure 3A:
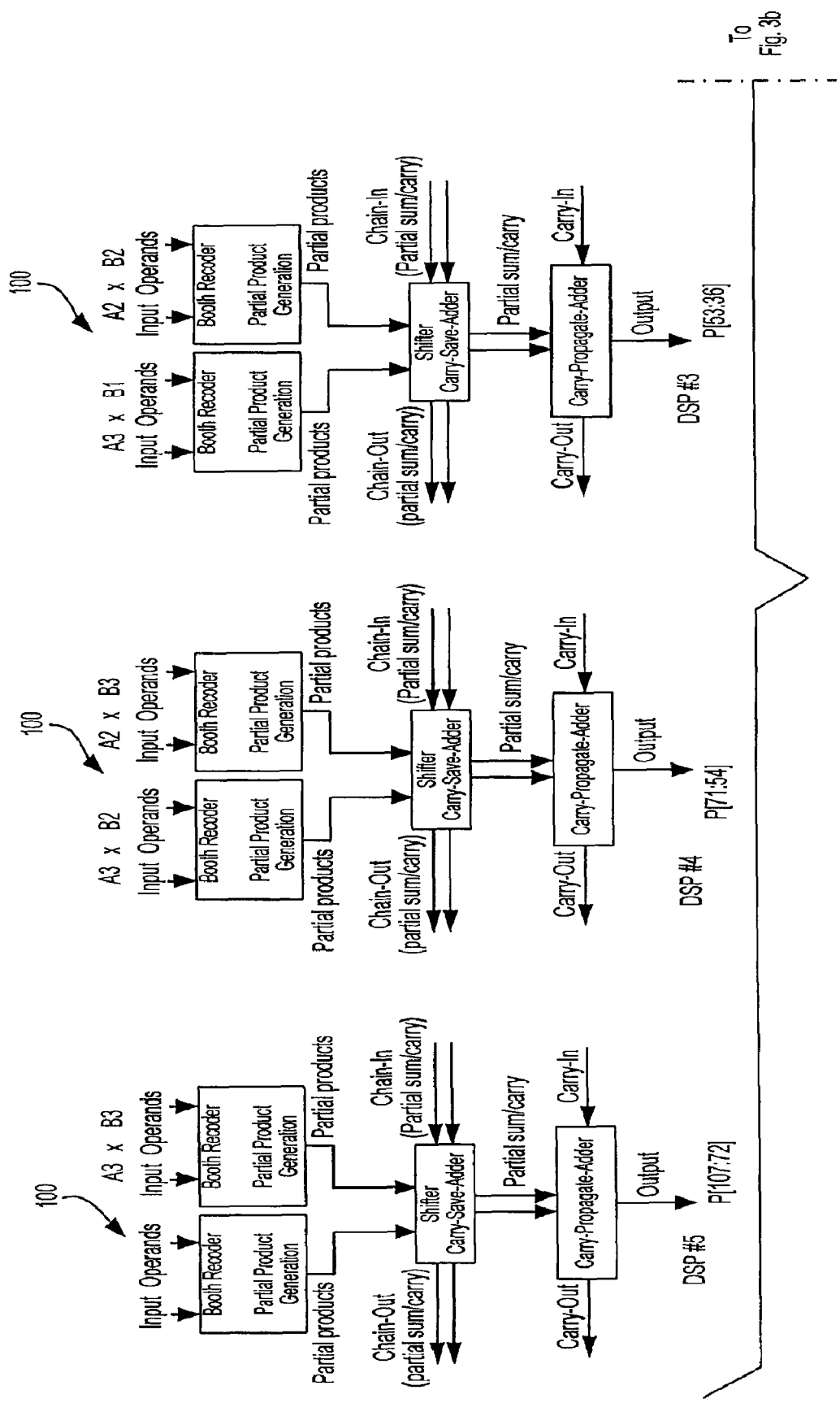
FIGS. 3a and 3b, hereinafter referred to collectively as FIG. 3, are a schematic representation of the concatenation of a plurality of DSP blocks in accordance with an embodiment of the present invention to perform the decomposed multiplications of FIG. 2.
Figure 3B:
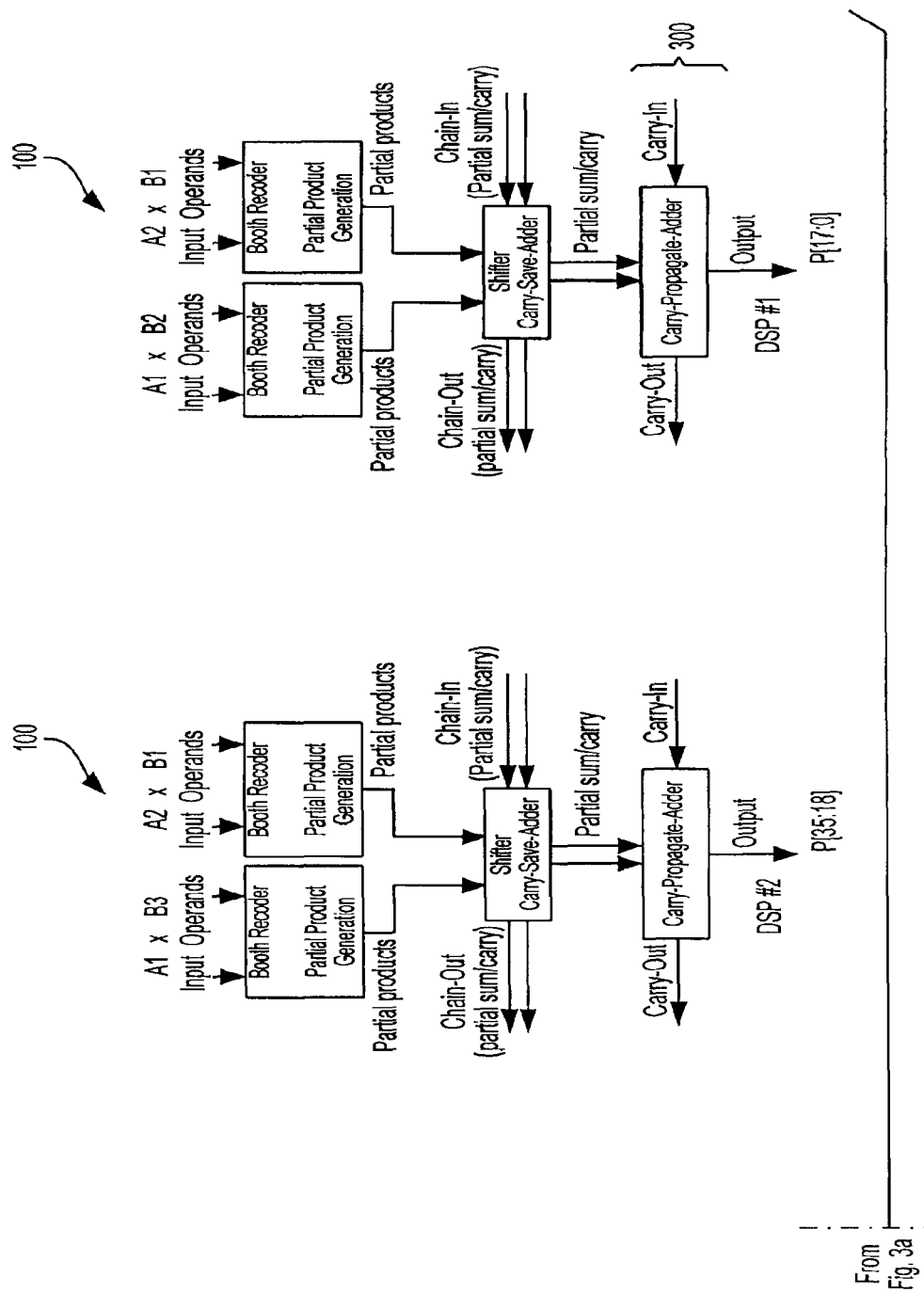

Using DSP block 100 of FIG. 1 with N=18, which includes two 18-bit-by-18-bit multipliers, the nine multiplications can be performed using five DSP blocks 100 (with one multiplier left over) as shown schematically in FIG. 3. FIG. 2 is annotated to show which of the DSP blocks 100 in FIG. 3 (identified as DSP #1, DSP #2, etc.) is used for which partial products. In each of DSP #1 through DSP #4, the least significant 18 bits go through the carry-propagate adder stage 300 to generate part of the final product while the rest of the partial sum and partial carry vectors are sent to the next DSP block 100 through the chain-out/chain-in bus, as follows:

DSP #1: add [(A1 × B2) << 18] and (A1 × B1), generate P[17:0] and carry-out signal, send the remaining upper partial sum/carry through chain-out to DSP #2.

DSP #2: add [(A1 × B3) << 18] and (A2 × B1) and chain-in from DSP #1, generate P[35:18] and carry-out signal, send the remaining upper partial sum/carry through chain-out to DSP #3.

DSP #3: add (A3 × B1) and (A2 × B2) and chain-in from DSP #2, generate P[53:36] and carry-out signal, send the remaining upper partial sum/carry through chain-out to DSP #4.

DSP #4: add (A3 × B2) and (A2 × B3) and chain-in from DSP #3, generate P[71:54] and carry-out signal, send the remaining upper partial sum/carry through chain-out to DSP #5.

DSP #5: add (A3 × B3) and chain-in from DSP #5, generate P[107:72].

Throughout the operation of the foregoing 54-bit-by-54-bit multiplier, carry-save signal buses are used, and there is only one carry-propagate operation for the final outputs, through 18 bits in each of DSP #1, #2, #3 and #4, and 36 bits in DSP #5. This does not need logic or routing resources in PLD logic core.

It should be noted that other operations also may be performed. For example, 36-bit-by 18, 36-bit-by 36, 54-bit-by-18-bit and 54-bit-by-36-bit multiplications, as well as a sum of four 18-bit-by-18-bit multiplications or two 36-bit-by-36-bit multiplications, all can be performed in a single column of chained DSP blocks 100.

Figure 4:
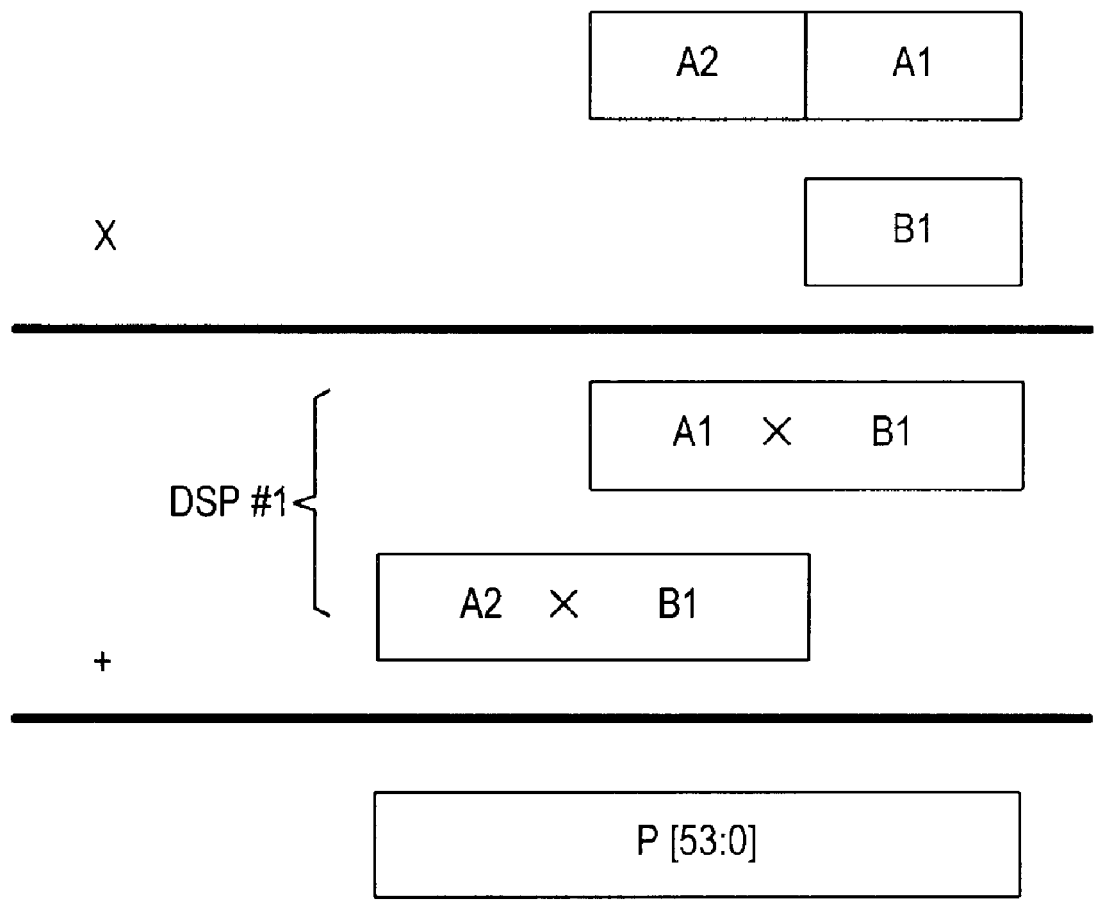
FIG. 4 is a representation of the decomposition of a 36-bit-by-18-bit multiplication into 18-bit-by-18-bit multiplications.
Figure 5:
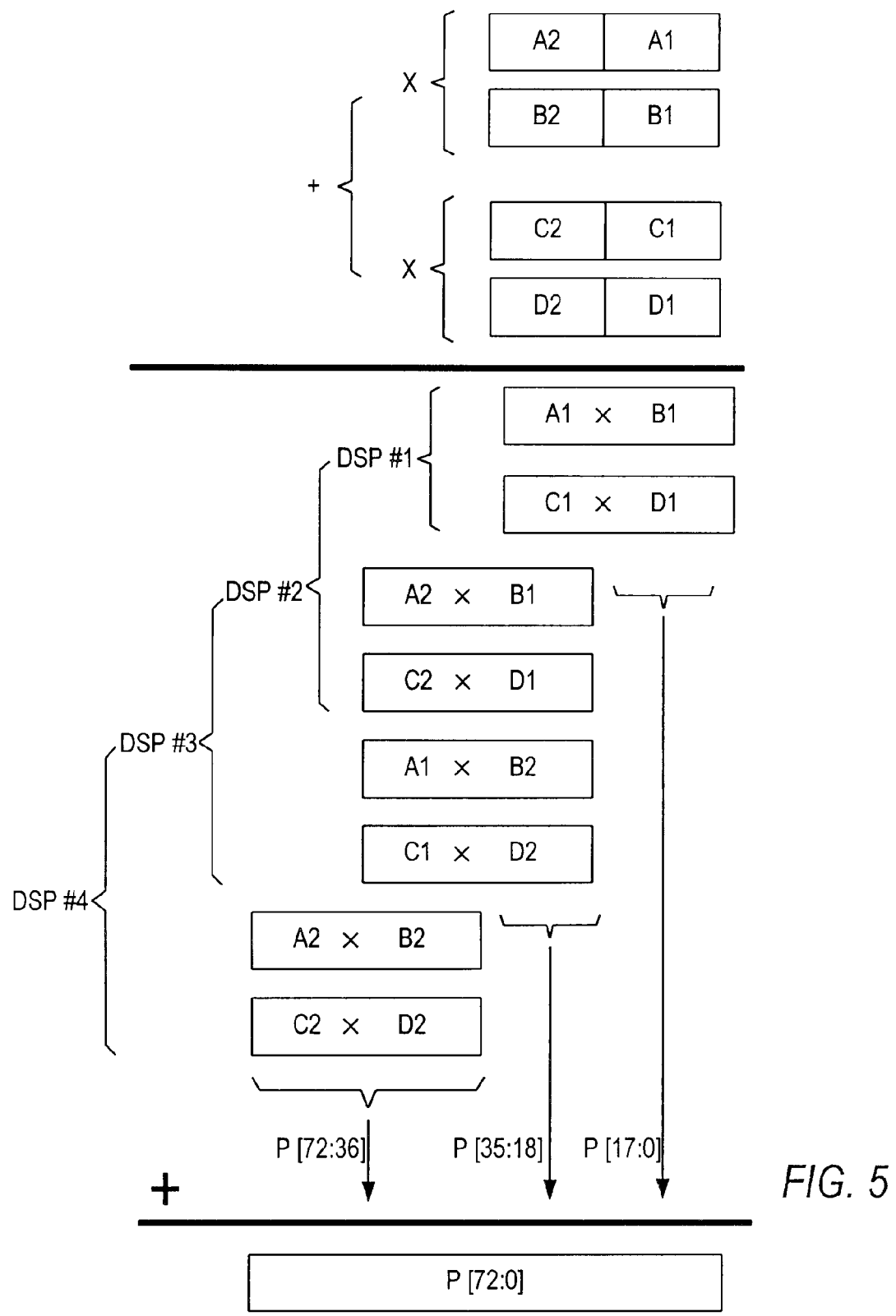
FIG. 5 is a representation of the decomposition of the addition of two 36-bit-by-36-bit multiplications into 18-bit-by-18-bit multiplications.

Thus it is seen that the present invention provides a generalized way to build large multipliers from a basic DSP block, with only one carry-propagate-adder operation is required for any size of operands. In the embodiment shown, all operations involving two multipliers may be performed efficiently within a single DSP block, such as addition or subtraction of two N-bit-by-N-bit multiplications, or a 2N-bit-by-N-bit multiplication. The latter is diagrammed in FIG. 4, which shows the decomposition of such an operation into two N-bit-by-N-bit multiplications. Other mixtures of multiplications and additions may be performed when multiple DSP blocks are concatenated together through the chain and carry connections, such as addition or subtraction of three or more N-bit-by-N-bit multiplications, addition or subtraction of two 2N-bit-by-2N-bit multiplications. FIG. 5 shows how the addition of two 2N-bit-by-2N-bit multiplications may be decomposed into eight N-bit-by-N-bit multiplications, which can be performed in four DSP blocks.

The invention eliminates the need to use logic circuitry or routing in the PLD logic core in the construction of large multipliers. This reduces power dissipation in the PLD, avoids routing congestion in the logic core, and maintains the maximum speed allowed within the DSP block. The modular construction of large multipliers also is more amenable to row-based redundancy protection in the PLD, and avoids the overhead of providing dedicated multipliers for large operand width in an PLD, as the width of operands is limited only by the number of adjacent DSP blocks with chain and carry connections.

Thus it is seen that a large multiplication that requires more than one specialized processing block of a PLD can be performed using fewer or no general-purpose programmable resources of the PLD.

Figure 6:
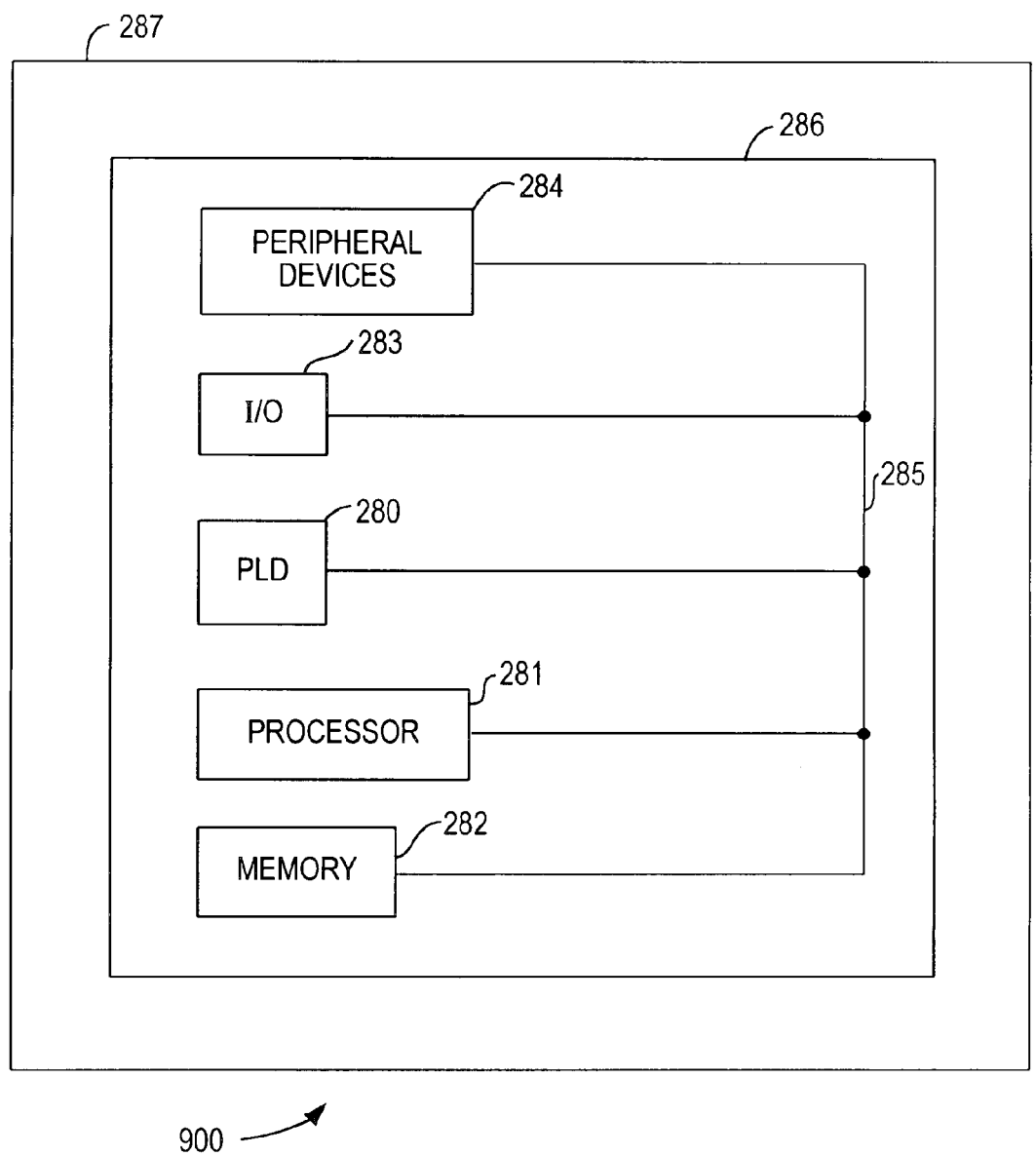
FIG. 6 is a simplified block diagram of an illustrative system employing a programmable logic device incorporating the present invention.

A PLD 280 incorporating such circuitry according to the present invention may be used in many kinds of electronic devices. One possible use is in a data processing system 900 shown in FIG. 6. Data processing system 900 may include one or more of the following components: a processor 281; memory 282; I/O circuitry 283; and peripheral devices 284. These components are coupled together by a system bus 285 and are populated on a circuit board 286 which is contained in an end-user system 287.

System 900 can be used in a wide variety of applications, such as computer networking, data networking, instrumentation, video processing, digital signal processing, or any other application where the advantage of using programmable or reprogrammable logic is desirable. PLD 280 can be used to perform a variety of different logic functions. For example, PLD 280 can be configured as a processor or controller that works in cooperation with processor 281. PLD 280 may also be used as an arbiter for arbitrating access to a shared resources in system 900. In yet another example, PLD 280 can be configured as an interface between processor 281 and one of the other components in system 900. It should be noted that system 900 is only exemplary, and that the true scope and spirit of the invention should be indicated by the following claims.

Various technologies can be used to implement PLDs 280 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A specialized processing block for a programmable integrated circuit device having a plurality of instances of said specialized processing block, each instance of said specialized processing block comprising:
   multiplier circuitry that performs at least one multiplication and provides partial sum/carry signals for each said at least one multiplication;
   a chain output for propagating partial sum/carry signals to any other of said instances of said specialized processing block;
   a chain input for receiving partial sum/carry signals propagated from any other of said instances of said specialized processing block;
   combining circuitry that combines said partial sum/carry signals for each said at least one multiplication and any said partial sum/carry signals propagated from any other of said instances of said specialized processing block, for propagation to said chain output; and
   circuitry for programmably routing signals within said specialized processing block.

2. The specialized processing block of claim 1, wherein each of said instances of said specialized processing block further comprises:
   carry-propagate adder circuitry for adding output of said combining circuitry and generating a carry-out signal;
   a carry output for propagating said carry-out signal to other of said instances of said specialized processing block; and
   a carry input for receiving a carry-out signal from any other of said instances of said specialized processing block as a carry-in signal to said carry-propagate adder circuitry.

3. The specialized processing block of claim 2 wherein said circuitry for programmably routing signals within said specialized processing block comprises carry bypass circuitry for directly connecting said carry input to said carry output.

4. The specialized processing block of claim 3 wherein said circuitry for programmably routing signals within said specialized processing block further comprises chain bypass circuitry for directly connecting said chain input to said chain output.

5. The specialized processing block of claim 2 wherein said circuitry for programmably routing signals within said specialized processing block comprises chain bypass circuitry for directly connecting said chain input to said chain output.

6. The specialized processing block of claim 1 wherein said multiplication circuitry performs a plurality of multiplications.

7. The specialized processing block of claim 6 wherein said multiplication circuitry performs two multiplications.

8. The specialized processing block of claim 1 wherein said multiplication circuitry comprises at least one carry-save adder.

9. The specialized processing block of claim 1 wherein said combining circuitry comprises at least one compressor.

10. The specialized processing block of claim 1 wherein:
    said multiplier circuitry performs a plurality of multiplications; and
    said combining circuitry comprises:
    a first compressor for combining outputs of said plurality of multiplications, and
    a second compressor for combining output of said first compressor with said partial sum/carry signals propagated from any other of said instances of said specialized processing block on said chain input.

11. The specialized processing block of claim 1 wherein said circuitry for programmably routing signals within said specialized processing block comprises chain bypass circuitry for directly connecting said chain input to said chain output.

12. A programmable integrated circuit device comprising a plurality of specialized processing blocks, each of said specialized processing blocks comprising:
    multiplier circuitry that performs at least one multiplication of a first size and provides partial sum/carry signals for each said at least one multiplication;
    a chain output for propagating partial sum/carry signals to another said specialized processing block;
    a chain input for receiving partial sum/carry signals propagated from another said specialized processing block;
    combining circuitry that combines said partial sum/carry signals for each said at least one multiplication and any said partial sum/carry signals propagated from another said specialized processing block, for propagation to said chain output; and
    circuitry for programmably routing signals within said specialized processing block; wherein:

a number of said specialized processing blocks are chained together to perform a multiplication larger than said first size.

13. The programmable integrated circuit device of claim 12 wherein said plurality of specialized processing blocks are adjacent one another.

14. The programmable integrated circuit device of claim 12 wherein each said specialized processing block further comprises:
   carry-propagate adder circuitry for adding output of said combining circuitry and generating a carry-out signal;
   a carry output for propagating said carry-out signal to another said specialized processing block; and
   a carry input for receiving a carry-out signal from a different said specialized processing block as a carry-in signal to said carry-propagate adder circuitry.

15. The programmable integrated circuit device of claim 14 wherein said circuitry for programmably routing signals within said specialized processing block comprises chain bypass circuitry for directly connecting said chain input to said chain output.

16. The programmable integrated circuit device of claim 15 wherein said circuitry for programmably routing signals within said specialized processing block comprises carry bypass circuitry for directly connecting said carry input to said carry output.

17. The programmable integrated circuit device of claim 14 wherein said circuitry for programmably routing signals within said specialized processing block comprises carry bypass circuitry for directly connecting said carry input to said carry output.

18. The programmable integrated circuit device of claim 12 wherein, in each said specialized processing block, said multiplication circuitry performs a plurality of multiplications.

19. The programmable integrated circuit device of claim 18 wherein, in each said specialized processing block, said multiplication circuitry performs two multiplications.

20. The programmable integrated circuit device of claim 12 wherein, in each said specialized processing block, said multiplication circuitry comprises at least one carry-save adder.

21. The programmable integrated circuit device of claim 12 wherein, in each said specialized processing block, said combining circuitry comprises at least one compressor.

22. The programmable integrated circuit device of claim 12 wherein, in each said specialized processing block:
   said multiplication circuitry performs a plurality of multiplications; and
   said combining circuitry comprises:
   a first compressor for combining outputs of said plurality of multiplications, and
   a second compressor for combining output of said first compressor with said partial sum/carry signals propagated from another said specialized processing block on said chain input.

23. The programmable integrated circuit device of claim 12 wherein said circuitry for programmably routing signals within said specialized processing block comprises chain bypass circuitry for directly connecting said chain input to said chain output.

24. A programmable integrated circuit device comprising:
   a plurality of specialized processing blocks programmably chained together to perform a multiplication of a first size; wherein:
   each said specialized processing block is programmably operable to independently perform a multiplication of a second size; and
   said first size is larger than said second size.

25. The programmable integrated circuit device of claim 24 wherein each said specialized processing block comprises:
   multiplier circuitry that performs at least one multiplication and provides partial sum/carry signals for each said at least one multiplication; and
   combining circuitry that combines said partial sum/carry signals for each said at least one multiplication and any partial sum/carry signals propagated from another said specialized processing block.

26. The programmable integrated circuit device of claim 25 wherein each said specialized processing block further comprises:
   carry-propagate adder circuitry for adding output of said combining circuitry and generating a carry-out signal;
   a carry output for propagating said carry-out signal to another said specialized processing block; and
   a carry input for receiving a carry-out signal from a different said specialized processing block as a carry-in signal to said carry-propagate adder circuitry.

27. The programmable integrated circuit device of claim 25 wherein, in each said specialized processing block, said multiplier circuitry comprises at least one carry-save adder.

28. The programmable integrated circuit device of claim 25 wherein each said specialized processing block further comprises:
   a chain output for propagating partial sum/carry signals to another said specialized processing block; and
   a chain input for receiving partial sum/carry signals propagated from another said specialized processing block.

29. The programmable integrated circuit device of claim 28 wherein, in each said specialized processing block:
   said multiplier circuitry performs a plurality of multiplications; and
   said combining circuitry comprises:
   a first compressor for combining outputs of said plurality of multiplications, and
   a second compressor for combining output of said first compressor with said partial sum/carry signals propagated from another said specialized processing block on said chain input.

* * * * *